United States Patent
Sessa et al.

(10) Patent No.: US 11,168,817 B2
(45) Date of Patent: Nov. 9, 2021

(54) SHUNT TUBE CONNECTION ASSEMBLY

(71) Applicant: Weatherford Technology Holdings, LLC, Houston, TX (US)

(72) Inventors: Michael Joseph Sessa, Houston, TX (US); Jason Brasseaux, Cypress, TX (US); Scott Crowley, Houston, TX (US); Joshua Hornsby, Tomball, TX (US); Stephen McNamee, Cypress, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 621 days.

(21) Appl. No.: 15/951,859

(22) Filed: Apr. 12, 2018

(65) Prior Publication Data
US 2018/0299046 A1    Oct. 18, 2018

Related U.S. Application Data (60) Provisional application No. 62/484,825, filed on Apr. 12, 2017.

(51) Int. Cl.
*F16L 27/08* (2006.01)
*F16L 21/035* (2006.01)
*E21B 17/046* (2006.01)
*E21B 43/04* (2006.01)
*F16L 21/08* (2006.01)

(52) U.S. Cl.
CPC .......... *F16L 21/035* (2013.01); *E21B 17/046* (2013.01); *E21B 43/045* (2013.01); *F16L 21/08* (2013.01)

(58) Field of Classification Search
CPC ....... F16L 21/002; F16L 21/02; F16L 21/022; F16L 21/035; F16L 21/08; F16L 37/088; F16L 27/08; F16L 27/0804; F16L 27/0808; F16L 27/12; F16L 27/127
USPC ............ 285/369, 321, 15, 31, 302, 298, 223
See application file for complete search history.

(56) References Cited

U.S. PATENT DOCUMENTS

| | | | |
|---|---|---|---|
| 4,630,630 A * | 12/1986 | Reynolds | F16L 37/088 137/68.23 |
| 5,390,966 A | 2/1995 | Cox et al. | |
| 5,975,587 A * | 11/1999 | Wood | F16L 37/0926 285/15 |
| 6,409,219 B1 | 6/2002 | Broome et al. | |
| 7,493,959 B2 | 2/2009 | Johnson et al. | |
| 7,828,056 B2 | 11/2010 | Dybevik et al. | |

(Continued)

FOREIGN PATENT DOCUMENTS

| | | |
|---|---|---|
| GB | 2488290 A | 8/2012 |
| WO | 2016144301 A1 | 9/2016 |

OTHER PUBLICATIONS

Partial International Search Report in related application PCT/US2018/027235 dated Jul. 27, 2018.

(Continued)

*Primary Examiner* — Aaron M Dunwoody
(74) *Attorney, Agent, or Firm* — Patterson+ Sheridan, LLP (57) ABSTRACT

A connection assembly for a tube having a first pin attached to the tube, the first pin having a first sealing member; a second pin attached to a jumper tube, the second pin having a second sealing member; and a movable sleeve configured to sealingly engage the first sealing member and the second sealing member.

9 Claims, 12 Drawing Sheets

(56) References Cited

U.S. PATENT DOCUMENTS

| | | |
|---|---|---|
| 8,347,956 B2 | 1/2013 | Yeh et al. |
| 8,783,348 B2 | 7/2014 | Edwards et al. |
| 8,789,611 B2 | 7/2014 | Greci et al. |
| 8,794,338 B2 | 8/2014 | Greci et al. |
| 8,807,205 B2 | 8/2014 | Cunningham |
| 8,893,789 B2 | 11/2014 | Cunningham et al. |
| 8,910,979 B1 * | 12/2014 | Fails .................... F16L 37/148 285/15 |
| 8,967,240 B2 | 3/2015 | Cunningham et al. |
| 9,074,458 B2 | 7/2015 | Cunningham et al. |
| 2013/0327542 A1 | 12/2013 | Least et al. |
| 2014/0158373 A1 | 6/2014 | Least et al. |
| 2014/0262208 A1 | 9/2014 | Cunningham et al. |
| 2015/0136391 A1 | 5/2015 | Cunningham et al. |
| 2015/0233216 A1 | 8/2015 | Rodrigue et al. |
| 2015/0240572 A1 | 8/2015 | Vu |
| 2015/0345257 A1 | 12/2015 | Veit |
| 2015/0361765 A1 | 12/2015 | Lopez et al. |
| 2017/0058647 A1 | 3/2017 | Langlais |

OTHER PUBLICATIONS

EAP Office Action dated Aug. 11, 2020, for Eurasian Patent Application No. 201992427.

International Search Report and Written Opinion in related application PCT/US2018023232 dated Jun. 7, 2018.

* cited by examiner

SHUNT TUBE CONNECTION ASSEMBLY

BACKGROUND

Production of hydrocarbons from loose, unconsolidated, and/or fractured formations often produces large volumes of particulates along with the formation fluids. These particulates can cause a variety of problems. For this reason, operators use gravel packing as a common technique for controlling the production of such particulates.

To gravel pack a completion, a screen is lowered on a workstring into the wellbore and is placed adjacent the subterranean formation. Particulate material, collectively referred to as "gravel," and a carrier fluid, is pumped as slurry down the workstring. Eventually, the slurry exits through a "cross-over" into the wellbore annulus formed between the screen and the wellbore.

The carrier fluid in the slurry normally flows into the formation and/or through the screen. However, the screen is sized so that gravel is prevented from flowing through the screen. This results in the gravel being deposited or "screened out" in the annulus between the screen and the wellbore to form a gravel-pack around the screen. Moreover, the gravel is sized so that it forms a permeable mass that allows produced fluids to flow through the mass and into the screen but blocks the flow of particulates into the screen.

Due to poor distribution of the gravel, it is often difficult to completely pack the entire length of the wellbore annulus around the screen. This can result in an interval within the annulus that is not completely gravel packed. The poor distribution of gravel is often caused by the carrier liquid in the slurry being lost to more permeable portions of the formation. Due to the loss of the carrier liquid however, the gravel in the slurry forms "sand bridges" in the annulus before all of the gravel has been placed around the screen.

Such bridges block further flow of the slurry through the annulus, thereby preventing the placement of sufficient gravel below the bridge in top-to-bottom packing operations or above the bridge in bottom-to-top packing operations. Alternate flow conduits, called shunt tubes, can alleviate this bridging problem by providing a flow path for the slurry around such sand bridges. The shunt tubes are typically run along the length of the screen and are attached to the screen by welds.

There is a need for a jumper tube connection assembly to provide connectivity between the shunt tubes of each screen joint.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
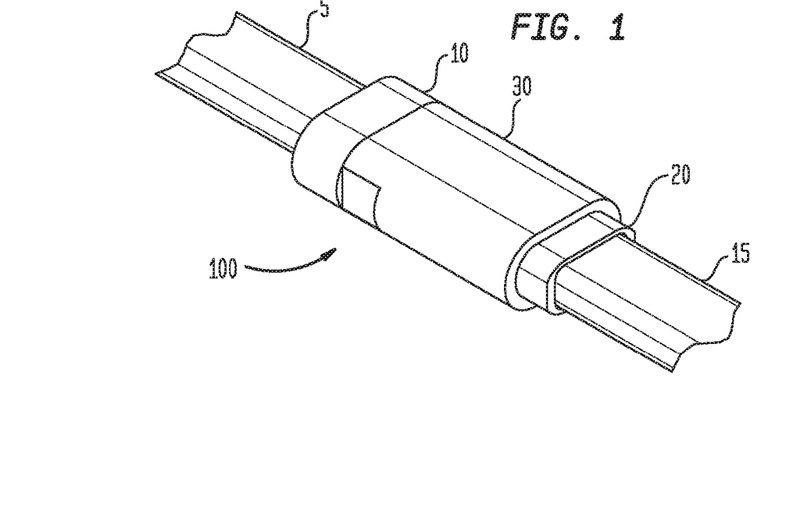
FIG. 1 illustrates an exemplary embodiment of a shunt tube connection assembly.
Figure 1A:
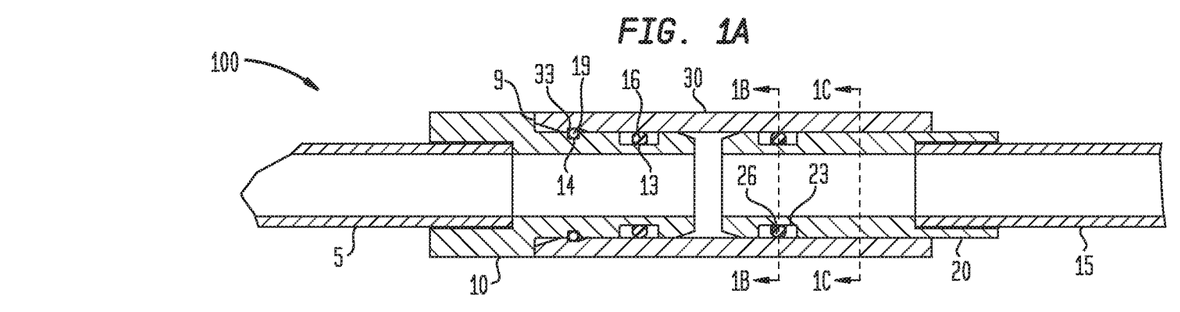
FIG. 1A is a cross-sectional view of the shunt tube connection assembly of FIG. 1.
Figure 1B:
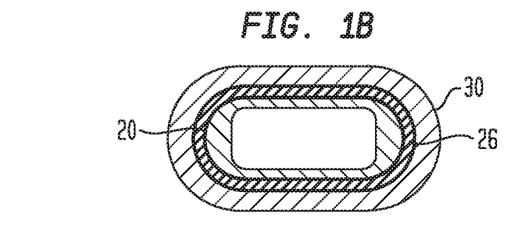
FIGS. 1B and 1C are different cross-sectional views of the connection assembly.
Figure 1C:
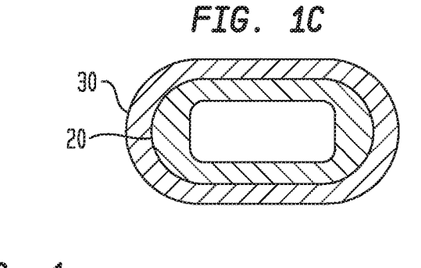

FIG. 1 illustrates an exemplary embodiment of a shunt tube connection assembly 100. FIG. 1A is a cross-sectional view of the shunt tube connection assembly 100. The connection assembly 100 includes a first pin 10 attached to a first shunt tube 5 on a tubular string, such as a screen, a jumper tube 15, a second pin 20 attached to the jumper tube 15, and a movable sleeve 30 disposed around the second pin 20 and engageable with the first pin 10. Another connection assembly is provided at the other end of the jumper tube 15 for connection to a second shunt tube on the tubular string. The connection assembly 100 may be used to couple the first shunt tube to the second shunt tube and form a sealed passage from the first shunt tube to the second shunt tube. In one embodiment, the pins 10, 20 are attached to the shunt tube 5 and the jumper tube 15, respectively, by welding.

Figure 2:
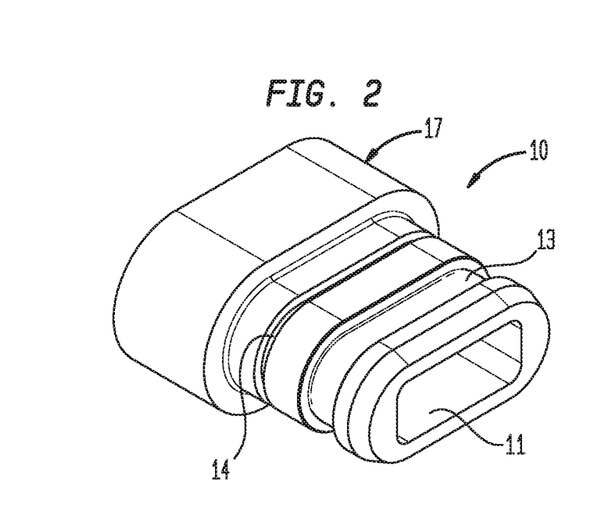
FIGS. 2 and 2D are different perspective views of the first pin according to one embodiment.
Figure 2A:
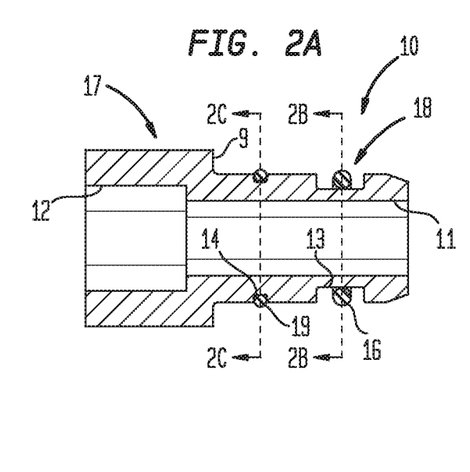
FIGS. 2A-2C are different cross-sectional views of the first pin 10 of FIGS. 2 and 2D.
Figure 2B:
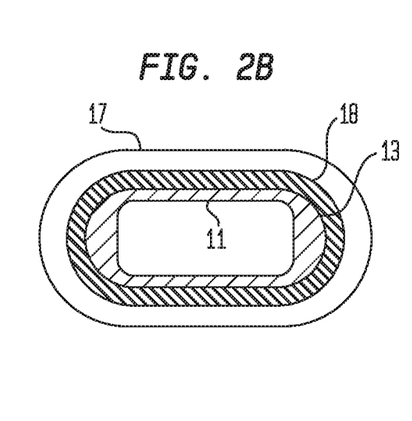
Figure 2C:
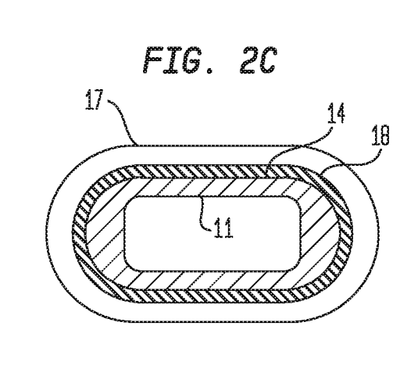
Figure 2D:
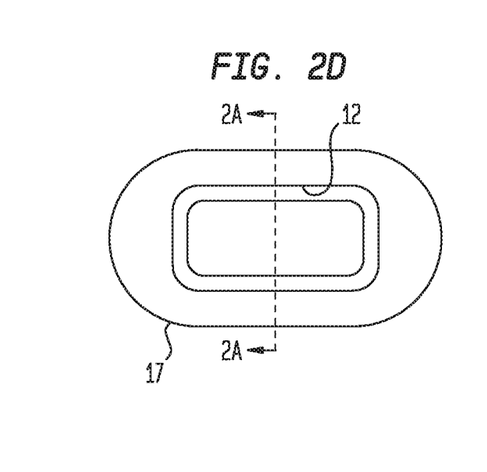

FIGS. 2 and 2D are different perspective views of the first pin 10 according to one embodiment. FIGS. 2A-2C are different cross-sectional views of the first pin 10 of FIGS. 2 and 2D. The first pin 10 includes a pin bore 11 for fluid communication therethrough. The back portion 17 of the first pin 10 includes an enlarged bore 12 for receiving the shunt tube 5. In this example, the pin bore 11 and the enlarged bore 12 are rectangular shaped. The outer perimeter of the back portion 17 is larger than the outer perimeter of the front portion 18 such that a shoulder 9 is formed. The outer perimeter of the front portion 18 and the back portion 17 may be oval shaped. A first recess 13 is formed on the outer surface of the front portion 18 for receiving a sealing member 16 such as an elastomeric o-ring, non-elastomeric ring, a thermoplastic polymer ("PEEK") ring, and other suitable sealing members. A second recess 14 is formed on the outer surface of the front portion 18 for retaining a locking member 19 such as a snap ring, a garter spring, an o-ring, and other suitable locking members. In this embodiment, the first recess 13 for the sealing member 16 is disposed in front of the second recess 14 for the locking member 19.

Figure 3:
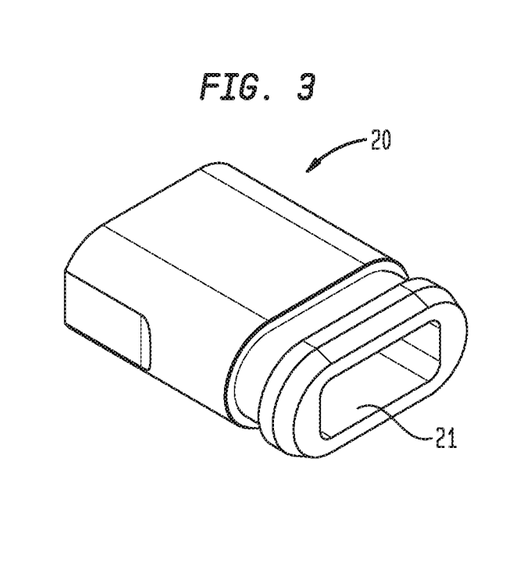
FIGS. 3, 3C and 3D are different perspective views of the second pin according to one embodiment.
Figures 3A, 3B:
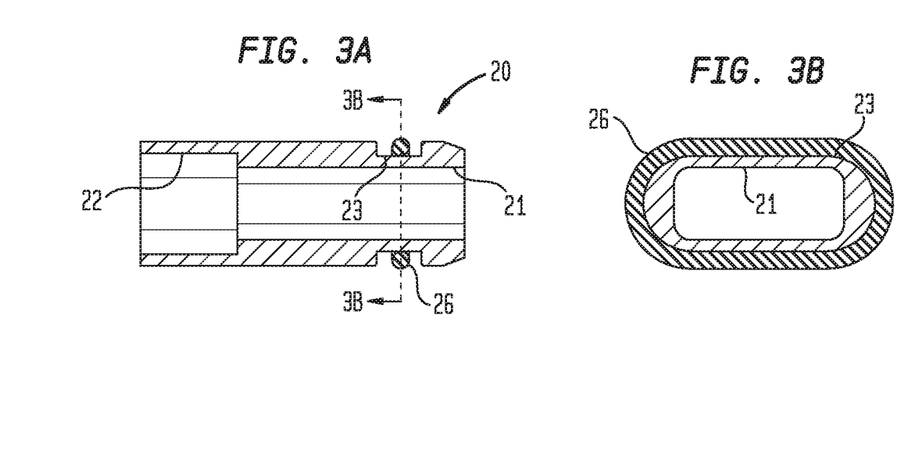
FIGS. 3A-3B are different cross-sectional views of the second pin of FIGS. 3, 3C and 3D.
Figure 3C:
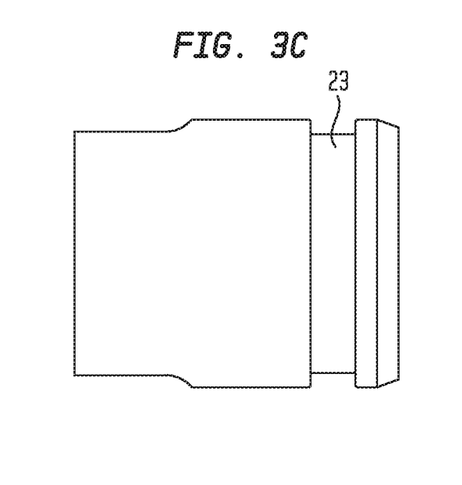
Figure 3D:
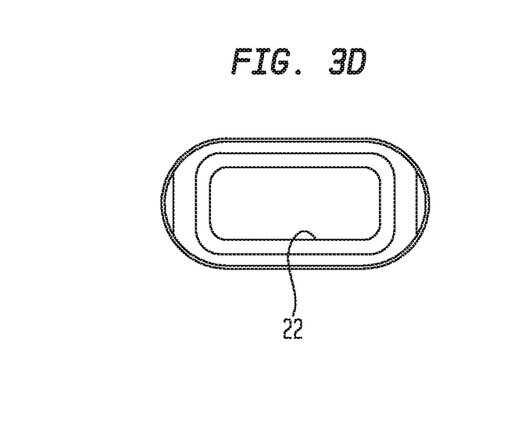

FIGS. 3, 3C and 3D are different perspective views of the second pin 20 according to one embodiment. FIGS. 3A-3B are different cross-sectional views of the second pin 20 of FIGS. 3, 3C and 3D. The second pin 20 includes a pin bore 21 for fluid communication therethrough. The back portion of the second pin 20 includes an enlarged bore 22 for receiving the jumper tube 15. The pin bore 21 is substantially the same size as the bore of the jumper tube 15. In this example, the pin bore 21 and the enlarged bore 22 are rectangular shaped. The outer perimeter of the second pin 20 may be oval shaped. A recess 23 is formed on the outer surface of the front portion for receiving a sealing member 26 such as an elastomeric o-ring, non-elastomeric ring, a thermoplastic polymer ("PEEK") ring, and other suitable sealing members. Optionally, a locking recess may be formed on the second pin 20, in addition to or instead of the locking recess 14 on the first pin 10, to receive a locking member.

Figure 4:
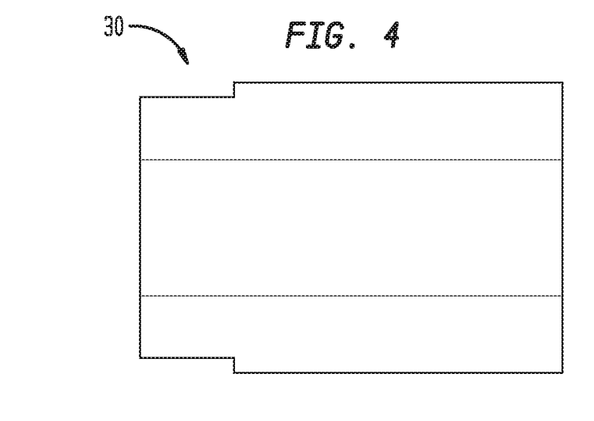
FIGS. 4 and 4D are different perspective views of the sleeve according to one embodiment.
Figure 4A:
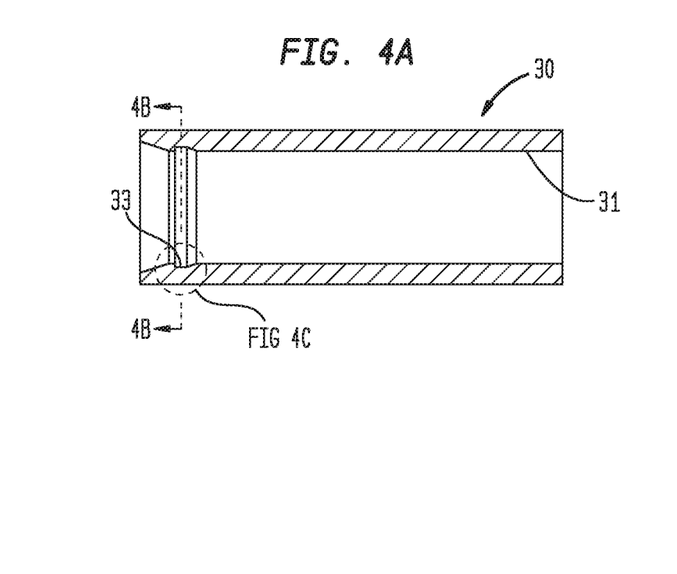
FIGS. 4A-4C are different cross-sectional views of the sleeve of FIGS. 4 and 4D.
Figure 4B:
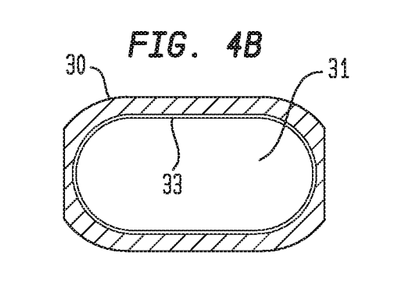
Figure 4C:
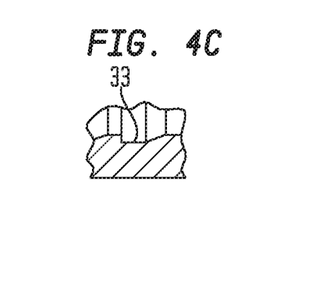
Figure 4D:
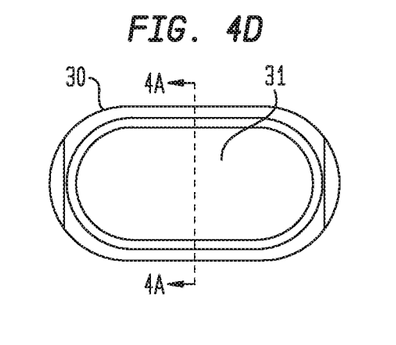

FIGS. 4 and 4D are different perspective views of the sleeve 30 according to one embodiment. FIGS. 4A-4C are different cross-sectional views of the sleeve 30 of FIGS. 4 and 4D. The sleeve 30 includes a tube bore 31 for housing the second pin 20 and the front portion of the first pin 10. In this example, the tube bore 31 has an oval shape that is similar to the oval shape of the first and second pins 10, 20. The sleeve 30 is axially movable along the second pin 20. A recess 33 formed on the inner surface of the tube bore 31 is configured to receive the locking member on the first pin 10.

Figure 5:
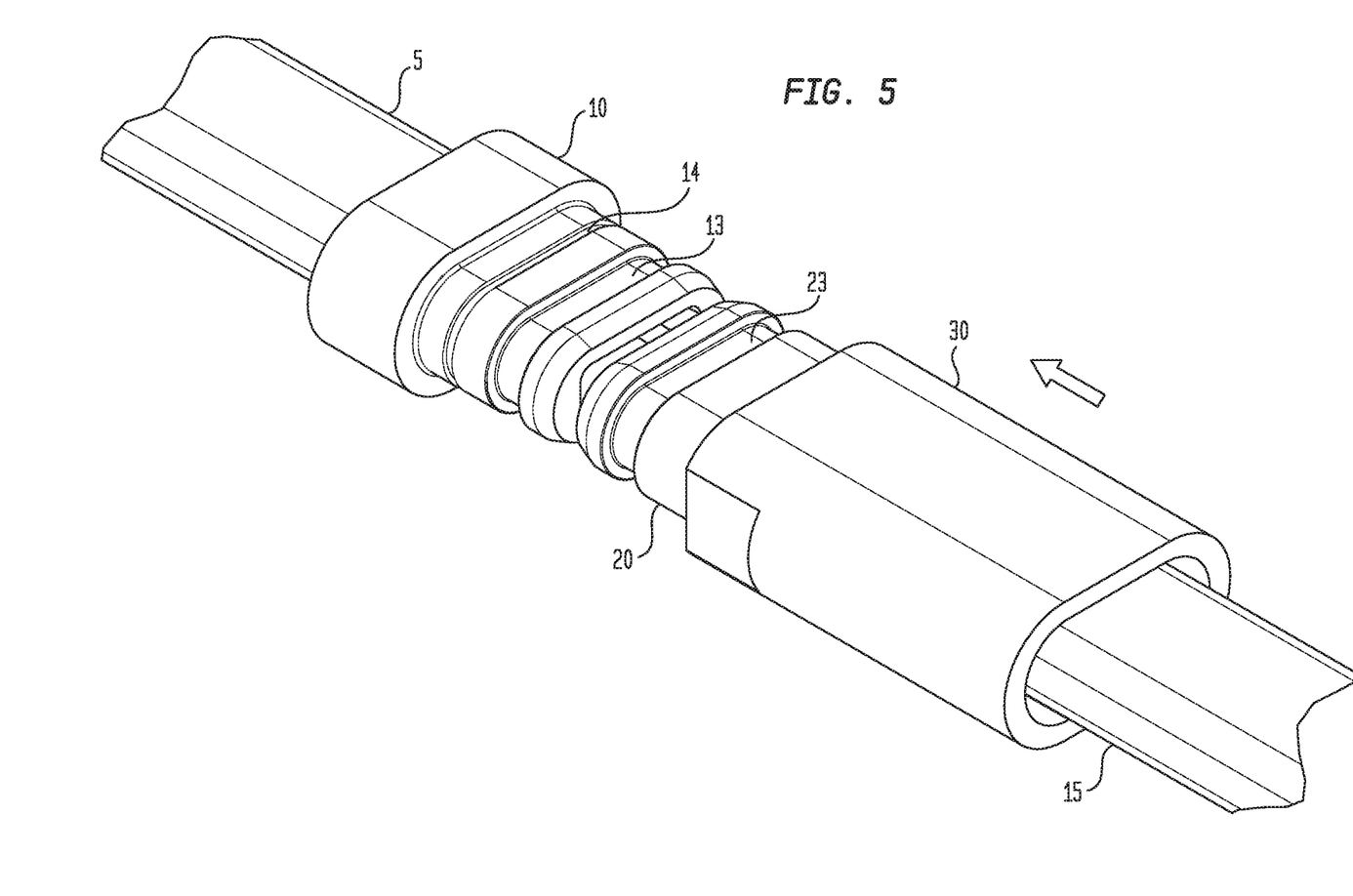
FIG. 5 further illustrates the connection assembly during the assembly process.

In operation, the first pin 10 is attached, such as by welding, to one end of a shunt tube 5. The second pin 20 is attached to one end of a jumper tube 15. The sleeve 30 is disposed around at least a portion of the second pin 20. The sleeve 30 is moved axially along the second pin 20 until the sleeve 30 slides over the front end of the first pin 10. See FIG. 5. The first pin 10 is moved until the locking member 19 of the first pin 10 engages the locking recess 33 of the sleeve 30. In one embodiment, the front end of the sleeve 30 abuts the shoulder of the first pin 10. The sealing members 16, 26 of the first and second pins 10, 20 sealingly contact the tube bore 31 of the sleeve 30.

Figure 6:
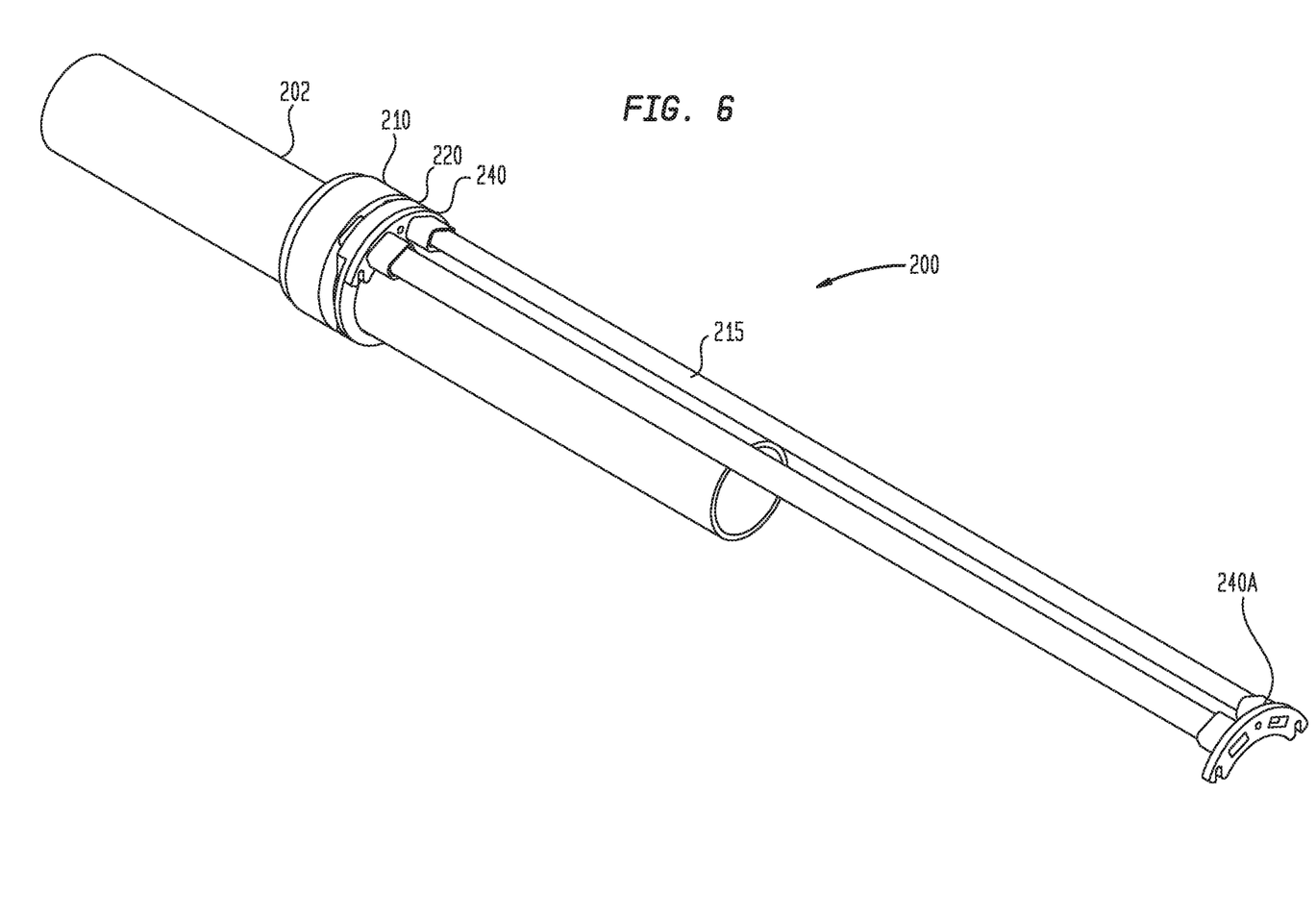
FIG. 6 illustrates an exemplary embodiment of a shunt tube connection assembly 200.
Figure 7:
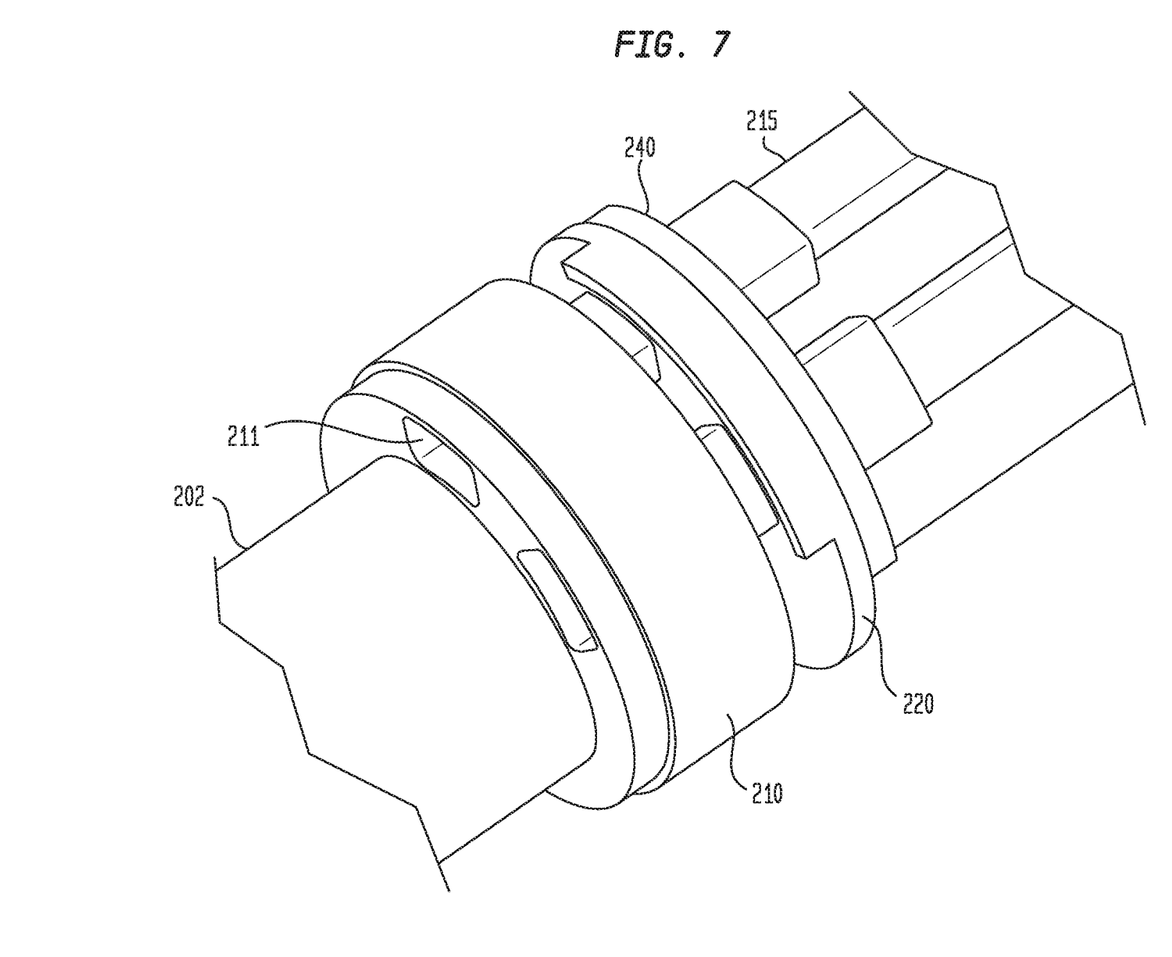
FIG. 7 illustrate an enlarged partial view of the connection assembly.
Figure 8:
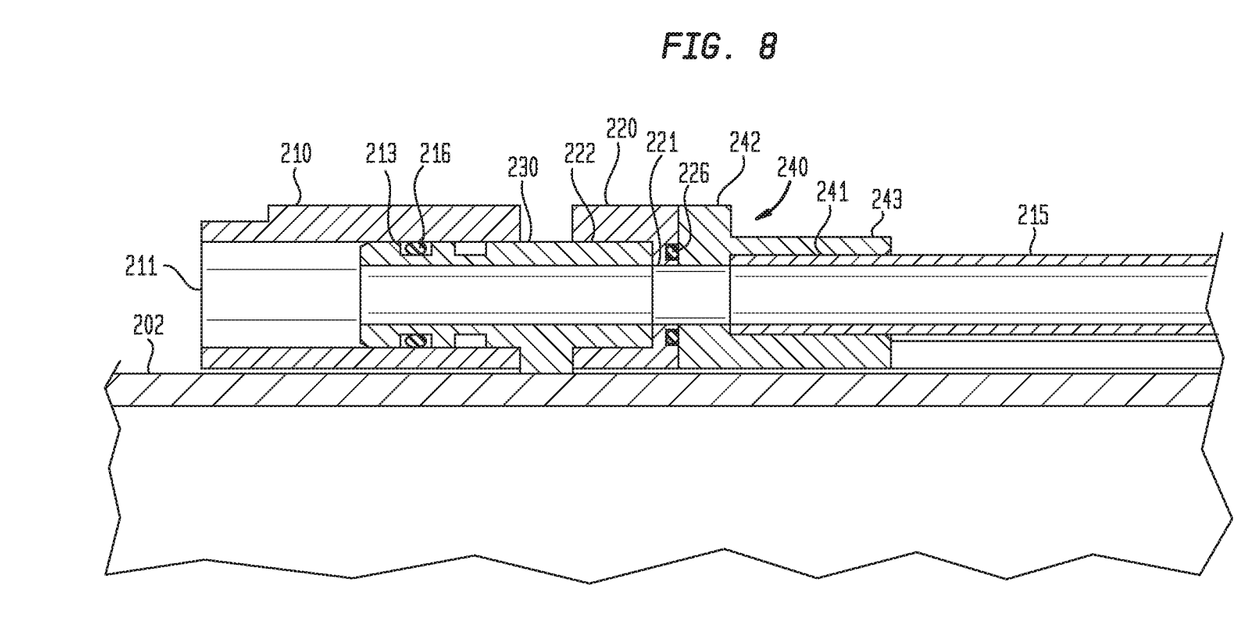
FIG. 8 illustrate a cross-sectional view of the connection assembly.
Figure 9:
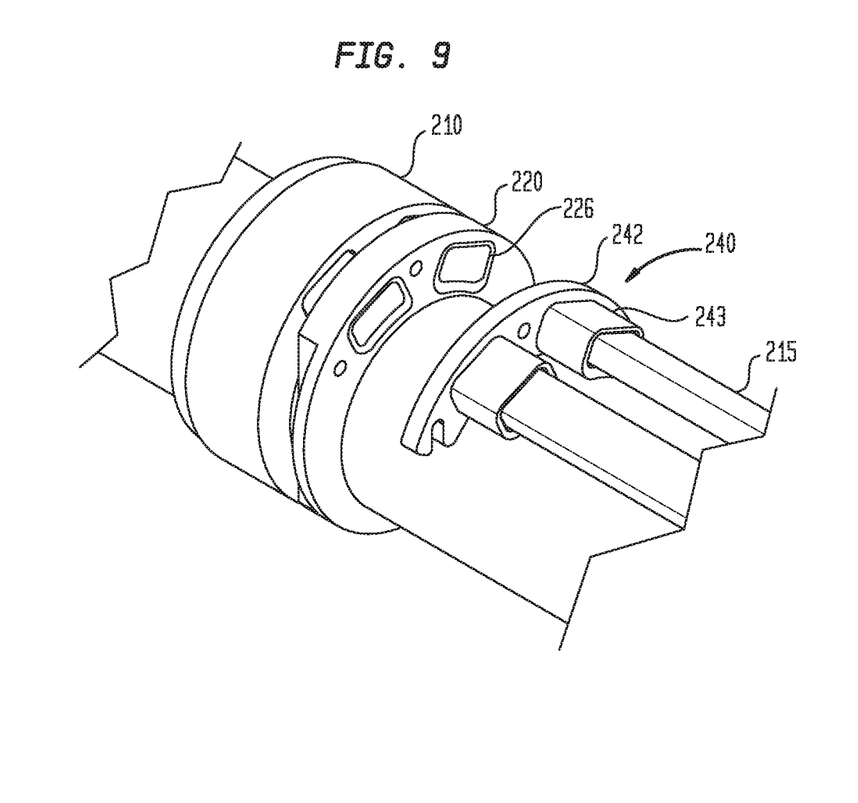
FIG. 9 illustrate the connection assembly prior to connection.

FIG. 6 illustrates an exemplary embodiment of a shunt tube connection assembly 200. FIG. 7 illustrates an enlarged partial view of the connection assembly 200. FIG. 8 illustrates a cross-sectional view of the connection assembly 200. FIG. 9 illustrates the connection assembly 200 prior to connection. The connection assembly 200 includes a connection ring 210, an adjustment ring 220, a connection tube 230, a manifold 240, and one or more jumper tubes 215. The connection assembly 200 is shown disposed on a tubular string 202, such as a screen. The connection ring 210 is configured to sealingly couple a first shunt tube on the screen to the connection assembly 200. Another connection assembly is provided at the other end of the jumper tube 215 for connection to a second shunt tube on the tubular string 202. For clarity, in FIG. 6, only a manifold 240A is shown at the other end of the jumper tube 215. The connection assembly 200 may be used to couple the first shunt tube to the second shunt tube and form a sealed passage from the first shunt tube to the second shunt tube. While not shown, the shunt tubes may be similar to the shunt tubes 5, 15 shown in FIG. 1.

Referring to FIGS. 7 and 8, the connection ring 210 includes a main bore for accommodating the screen 202. The connection ring 200 may have an eccentric shape relative to the screen 202. In one embodiment, the main bore of the connection ring 210 is an eccentric bore for accommodating the screen 202. One or more shunt bores 211 are formed through the connection ring 220 for receiving a shunt tube of the screen 202. The shunt bores 211 are formed between the main bore and the outer perimeter of the connection ring 200. The connection ring 220 fluidly and sealingly connects the shunt tube of the screen 202 at one end and the connection tube 230 of the connection assembly 200 at the other end. In this example, two shunt bores 211 are provided in the connection ring 210 for connecting two shunt tubes. The shunt bores 211 may have a rectangular shape or any suitable shape that matches the shape of the shunt tube.

One end of the connection tube 230 is configured for insertion into the shunt bore 211 and sealingly engages the shunt bore 211. In one embodiment, one or more recesses 213 are formed on the outer surface of the connection tube 230 for retaining a sealing member 216 such as an elastomeric o-ring, non-elastomeric ring, a thermoplastic polymer ("PEEK") ring, and other suitable sealing members. The other end of the connection tube 230 is attached to the adjustment ring 220.

The adjustment ring 220 includes a bore for accommodating the screen 202. The adjustment ring 220 may have an eccentric shape relative to the screen 202. The adjustment ring 220 is axially movable along the screen 202. One or more shunt bores 221 are formed through the adjustment ring 220. In this example, two shunt bores 221 are provided in the adjustment ring 220. The shunt bores 221 may have a rectangular shape. One end of the adjustment ring 220 includes an enlarged bore for receiving and forming a seal connection with the connection tube 230. The other end of the adjustment ring 220 sealingly contacts the manifold 240 of the connection assembly 200. The end of the adjustment ring 220 facing the manifold 240 includes a groove 226 disposed around each shunt bore 221, as shown in FIG. 9. The groove 226 is configured to receive a sealing member such as an elastomeric o-ring, non-elastomeric ring, a thermoplastic polymer ("PEEK") ring, and other suitable sealing members.

The manifold 240 is configured to sealingly couple the jumper tube 215 to the adjustment ring 220. In this example, the manifold 240 has an arcuate shaped base 242 and two tube receivers 243 extending from the base 242 for receiving the jumper tubes 215. In one example, the jumper tubes 215 are disposed inside the tube receiver 243 and attached thereto, such as by welding. The shunt bores 241 of the manifold 240 are aligned with the shunt bores 221 of the adjustment ring 220. The manifold 240 can be attached to the adjustment ring 220 using a suitable fastener, such as a bolt, a screw, or a cam lock. After attachment, the manifold 240 sealingly engages the sealing members of the adjustment ring 220 to form a sealed passage.

In operation, the connection ring 210 is pre-attached to the screen 202. The connection ring 210 is disposed around the screen 202 and the shunt tubes, such as shunt tubes 15, of the screen 202 are inserted into the shunt bores 211. The shunt tubes are sealingly attached to the connection ring 210 such as by welding.

The adjustment ring 220 is slid over the screen 202 and the connection tubes 230 are inserted into the shunt bores 211 of the connection ring 210. The sealing members 216 of the connection tube 230 form a seal with the shunt bore 211. The adjustment ring 220 is movable relative to the screen 202. The manifold 240, attached to the end of the jumper tube 215, are then aligned with the shunt bores 221 of the adjustment ring 220. Fasteners such as a cam lock are used to attach the manifold 240 to the adjustment ring 220. During attachment, the adjustment ring 220 may move along the screen 202 to adjust for differences in the distance between the shunt tubes on the screen 202. The manifold 240 engages the sealing member in the groove 226 to form a sealed passage.

Figure 10:
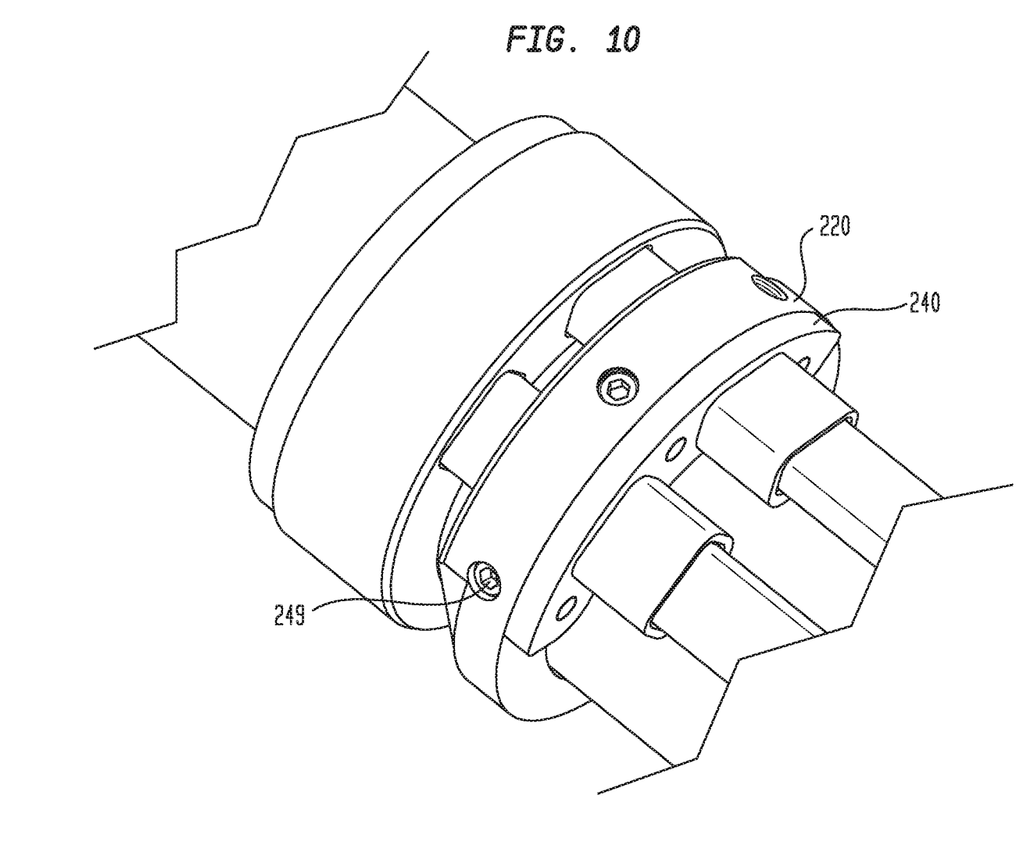
FIGS. 10 and 11 illustrate a cam lock for attaching the manifold to the adjustment ring.
Figure 11:
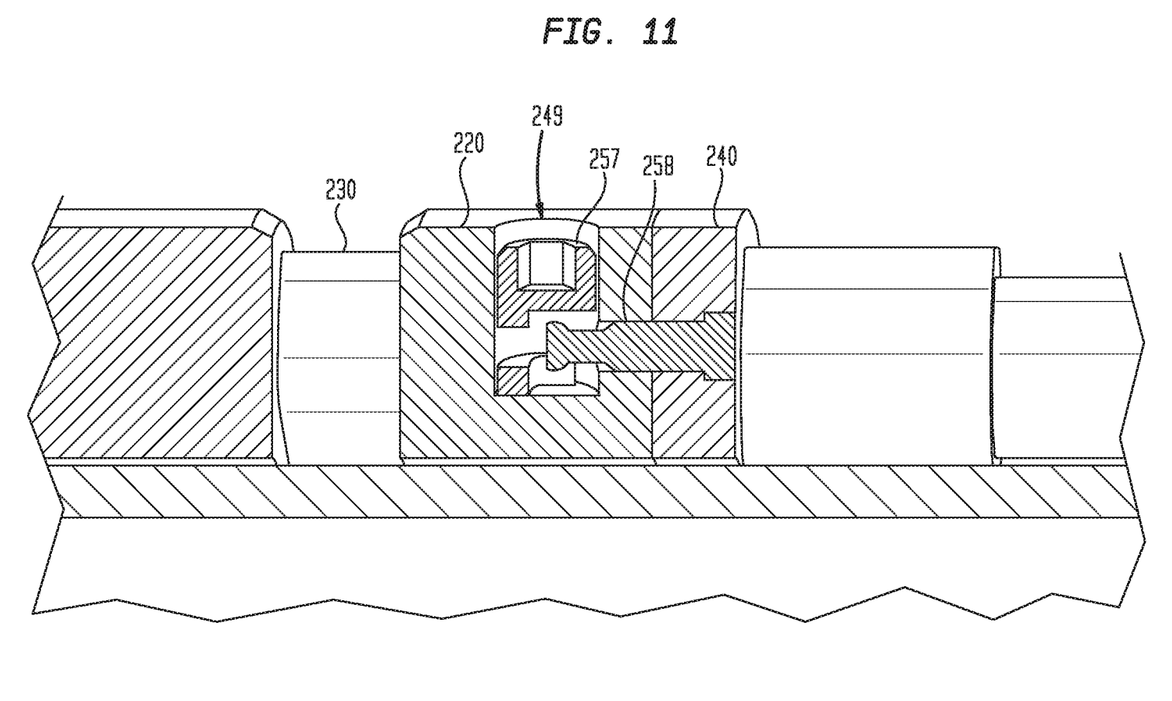

FIGS. 10 and 11 illustrate a cam lock 249 for attaching the manifold 240 to the adjustment ring 220. In this example, the cam lock 249 includes a dowel 258 and a cam receiver 257. The dowel 258 may be inserted through the manifold 240 and the adjustment ring 200. The cam receiver 257, located in an opening in the adjustment ring 200, is rotated to lock the dowel 258.

Figure 12:
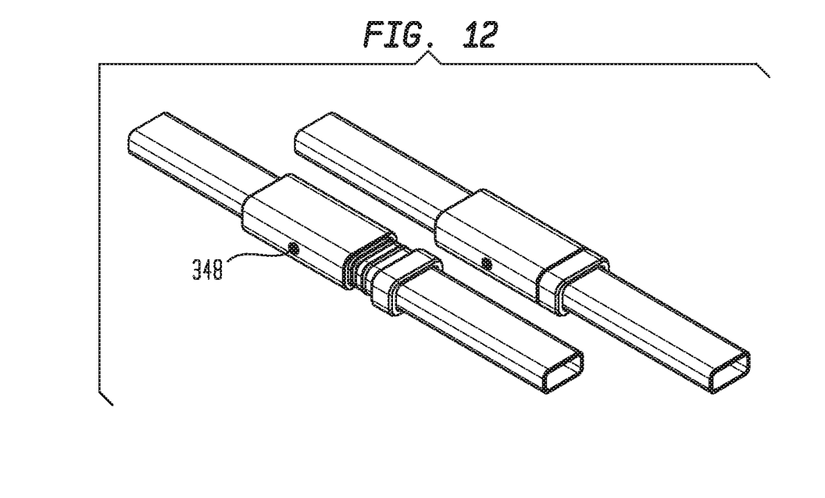
FIG. 12 illustrates an exemplary embodiment of a shunt tube connection assembly.
Figure 12A:
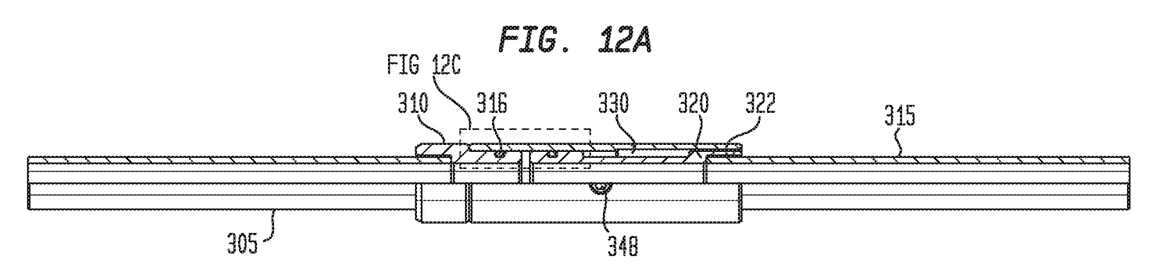
FIGS. 12A, 12B, and 12C are different cross-sectional views of the connection assembly.
Figure 12B:
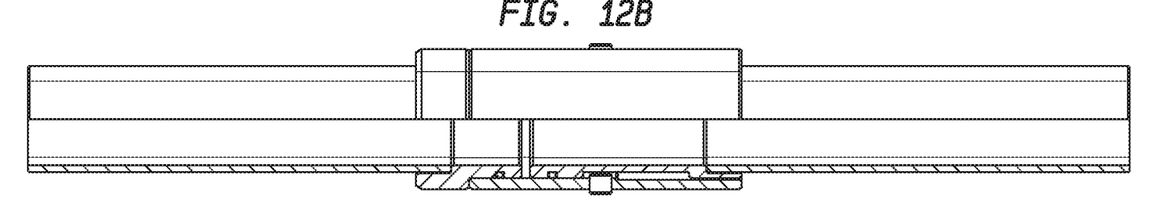
Figure 12C:
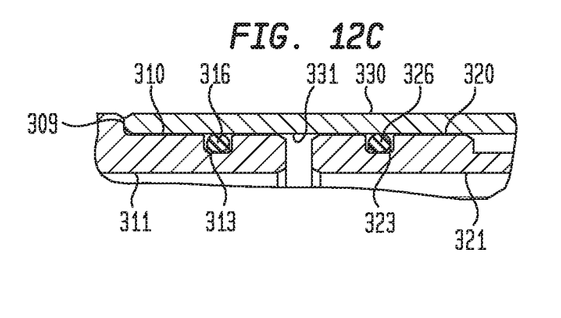
Figure 12D:
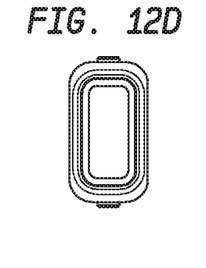
FIG. 12D is perspective view of one end of the connection assembly.

FIG. 12 illustrates an exemplary embodiment of a shunt tube connection assembly 300. FIGS. 12A, 12B, and 12C are different, partial cross-sectional views of the connection assembly 300. FIG. 12D is perspective view of one end of the connection assembly 300. The connection assembly 300 includes a first pin 310 attached to a first shunt tube 305 on a tubular string, such as a screen, a jumper tube 315, a second pin 320 attached to the jumper tube 315, and a movable sleeve 330 for engaging with the first pin 310. Another connection assembly is provided at the other end of the jumper tube 315 for connection to a second shunt tube on the tubular string. The connection assembly 300 may be used to couple the first shunt tube to the second shunt tube and form a sealed passage from the first shunt tube to the second shunt tube. In one embodiment, the pins 310, 320 are attached to the shunt tube 305 and the jumper tube 315, respectively, by welding.

As shown in FIGS. 12A and 12C, the first pin 310 includes a pin bore 311 for fluid communication therethrough. The back portion of the first pin 310 includes an enlarged bore for receiving the shunt tube 305. In this example, the pin bore 311 and the enlarged bore are rectangular shaped. The outer perimeter of the back portion is larger than the outer perimeter of the front portion such that a shoulder 309 is formed. A first recess 313 is formed on the outer surface for receiving a sealing member 316 such as an elastomeric o-ring, non-elastomeric ring, a thermoplastic polymer ("PEEK") ring, and other suitable sealing members.

The second pin 320 includes a pin bore 321 for fluid communication therethrough. The back portion of the second pin 320 includes an enlarged bore 322 for receiving the jumper tube 315. In this example, the pin bore 321 and the enlarged bore 322 are rectangular shaped. A recess 323 is formed on the outer surface for receiving a sealing member 326 such as an elastomeric o-ring, non-elastomeric ring, a thermoplastic polymer ("PEEK") ring, and other suitable sealing members.

The sleeve 330 includes a tube bore 331 for housing the second pin 320 and the front portion of the first pin 310. The sleeve 330 is axially movable along the second pin 320 and toward the first pin 310. The tube bore 331 can sealingly engage the sealing members 316 and 326 of the first and second pins 310, 320. One or more fasteners, such as one or more set screws 348, can be used to lock the sleeve 330 to the second pin 320 and/or the first pin 310.

In some embodiments, a connection assembly for a tube includes a first pin attached to the tube, the first pin having a first sealing member; a second pin attached to a jumper tube, the second pin having a second sealing member; and a movable sleeve configured to sealingly engage the first sealing member and the second sealing member.

In one or more of the embodiments described herein, the connection assembly includes a locking member for locking the first pin to the movable sleeve.

In one or more of the embodiments described herein, the locking member engages a recess in the movable sleeve.

In one or more of the embodiments described herein, the locking member is disposed in a recess of the first pin.

In one or more of the embodiments described herein, the first sealing member is disposed in a first recess of the first pin.

In one or more of the embodiments described herein, the first recess is formed in a smaller outer perimeter portion of the first pin.

In one or more of the embodiments described herein, the movable sleeve engages the smaller outer perimeter portion of the first pin.

In one or more of the embodiments described herein, the connection assembly includes a locking member for locking the first pin to the sleeve.

In one or more of the embodiments described herein, the locking member engages a recess in the movable sleeve.

In one or more of the embodiments described herein, the locking member is disposed in a second recess of the first pin.

In one or more of the embodiments described herein, the connection assembly includes a second locking member for locking the second pin to the sleeve.

In one or more of the embodiments described herein, the tube attaches to an enlarged bore of the first pin.

In one or more of the embodiments described herein, the jumper tube attaches to an enlarged bore of the movable sleeve.

In one or more of the embodiments described herein, at least one of the tube and the jumper tube is welded to the first pin and the movable sleeve, respectively.

In some embodiments, a connection assembly for a tube includes a connection ring having a tube bore for receiving the tube; a connection tube attached to an adjustment ring having a tube bore, the connection tube sealingly engageable with the tube bore of the connection ring; a manifold attached to a jumper tube; and a sealing member disposed between the manifold and the adjustment ring.

In one or more of the embodiments described herein, the sealing member is disposed on an end of the adjustment ring.

In one or more of the embodiments described herein, the sealing member is disposed in a groove surrounding the tube bore of the adjustment ring.

In one or more of the embodiments described herein, the adjustment ring is movable relative to the connection ring.

In one or more of the embodiments described herein, the connection tube includes a sealing member for sealing engagement with the connection ring.

In one or more of the embodiments described herein, the first sealing member is disposed in a recess of the connection tube.

In one or more of the embodiments described herein, the connection ring has an eccentric shape.

In some embodiments, a connection system for connecting a first tube to a second tube includes a jumper tube disposed between a first connector assembly and a second connector assembly. The first connector assembly includes a connection ring having a tube bore for receiving the first tube; a connection tube attached to an adjustment ring having a tube bore, the connection tube sealingly engageable with the tube bore of the connection ring; a manifold attached to the jumper tube; and a sealing member disposed between the manifold and the adjustment ring. The second connector assembly includes a connection ring having a tube bore for receiving the second tube; a connection tube attached to an adjustment ring having a tube bore, the connection tube sealingly engageable with the tube bore of the connection ring; a manifold attached to the jumper tube; and a sealing member disposed between the manifold and the adjustment ring.

In one or more of the embodiments described herein, the connection ring includes a main bore for receiving a screen.

While the foregoing is directed to embodiments of the present disclosure, other and further embodiments of the disclosure may be devised without departing from the basic scope thereof, and the scope thereof is determined by the claims that follow.

The invention claimed is:

1. A connection assembly for a tube, comprising:
   a first pin attached to the tube, the first pin having a first sealing member;
   a second pin attached to a jumper tube, the second pin having a second sealing member;
   a movable sleeve having a tube bore configured to sealingly engage the first sealing member and the second sealing member and to receive at least a portion of the first pin, the movable sleeve disposed around at least a portion of the second pin and movable relative to the second pin from a first axial position to a second axial position to engage the first pin; and
   a locking member disposed in a first recess of the first pin, the locking member configured to engage the tube bore of the movable sleeve in the second axial position to lock the first pin to the movable sleeve, wherein the second pin remains axially movable relative to the movable sleeve after the movable sleeve is locked to the first pin.

2. The assembly of claim 1, wherein the locking member engages a recess formed in the tube bore of the movable sleeve.

3. The assembly of claim 1, wherein the first sealing member is disposed in a second recess of the first pin.

4. The assembly of claim 3, wherein the second recess is formed in a smaller outer perimeter portion of the first pin.

5. The assembly of claim 4, wherein the movable sleeve engages the smaller outer perimeter portion of the first pin.

6. The assembly of claim 1, further comprising a second locking member for locking the second pin to the sleeve.

7. The assembly of claim 1, wherein the tube attaches to an enlarged bore of the first pin.

8. The assembly of claim 7, wherein the jumper tube attaches to an enlarged bore of the second pin.

9. The assembly of claim 8, wherein at least one of the tube and the jumper tube is welded to the corresponding first pin or second pin, respectively.

* * * * *